United States Patent [19]

Chace

[11] Patent Number: 5,172,410
[45] Date of Patent: Dec. 15, 1992

[54] CONFERENCE TELEPHONE SYSTEM AND METHOD

[75] Inventor: Artner B. Chace, Granby, Mass.

[73] Assignee: Sound Control Technologies, Inc., Norwalk, Conn.

[21] Appl. No.: 515,067

[22] Filed: Apr. 26, 1990

[51] Int. Cl.⁵ .............................................. H04M 1/00
[52] U.S. Cl. .................................. 379/388; 379/394; 379/391; 379/6; 379/400
[58] Field of Search ............... 379/394, 388, 391, 392, 379/5, 6, 30, 400, 402, 403, 404

[56] References Cited

U.S. PATENT DOCUMENTS

| | | | |
|---|---|---|---|
| 3,177,295 | 4/1965 | Lane et al. | 379/394 X |
| 3,582,563 | 6/1971 | Cragg | 379/394 X |
| 3,708,630 | 1/1973 | Matsuda et al. | 379/394 X |
| 3,810,247 | 5/1974 | Ono | 379/394 |
| 3,982,078 | 9/1976 | Janssen et al. | 379/394 |
| 3,982,080 | 9/1976 | Ukeiley | 379/403 |
| 4,394,542 | 7/1983 | Hara et al. | 379/394 |
| 4,602,338 | 7/1986 | Cook | 379/6 X |
| 4,634,964 | 1/1987 | Chattler | 379/6 X |
| 4,887,288 | 12/1989 | Erving | 379/6 |
| 4,910,768 | 3/1990 | Sues et al. | 379/394 |

Primary Examiner—James L. Dwyer
Assistant Examiner—M. Shehata
Attorney, Agent, or Firm—Handal & Morofsky

[57] ABSTRACT

A speaker telephone comprising a microphone outputting an electrical signal, and a loudspeaker is disclosed. An amplifier has its output coupled to the loudspeaker. This amplifier has non-inverting and inverting inputs. A switch having two positions couples the microphone to the amplifier or couples the tuning signal source to one of the inputs of the amplifier. A tuning signal source and control circuit output a tuning signal. Initiation means initiates a tuning sequence by causing the switch to be in the second position and causing the tuning signal source and control circuit to generate tuning signals. A coupling device is connected to one of the inputs of the amplifier and adopted to be connected to a telephone circuit. A hybrid voltage generator circuit is responsive to the output of the microphone when the switch couples the microphone to the amplifier to generate at its output a cancellation signal which prevents transmitted voice signals from appearing at the loudspeaker.

20 Claims, 11 Drawing Sheets

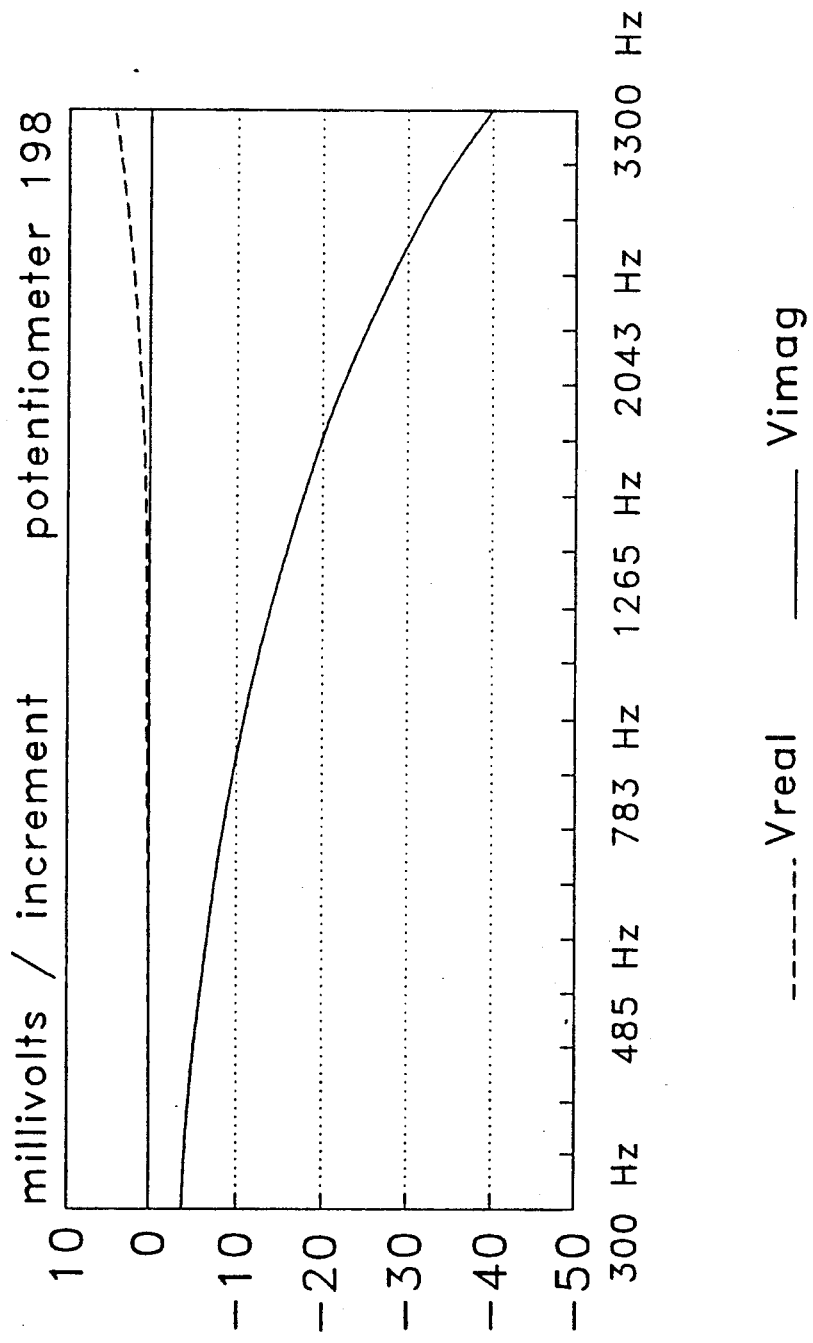

CONFERENCE TELEPHONE SYSTEM AND METHOD

TECHNICAL FIELD

The present invention relates to circuits for providing duplex telecommunication over telephone lines in the context of a conference telephone system comprising a loudspeaker and a microphone.

BACKGROUND

One very basic aspect of face-to-face human communication is the ability of the two parties to both talk and be heard at the same time. This aspect of face-to-face communication is quite important, insofar as it enables parties to a conversation to interrupt each other and thus build substantial efficiency into their communication. It is also important in other respects, for example, in the event that one party is beginning to speak about something which may, perhaps unknown to him, be uncomfortable to a third party to the conversation or otherwise destructive of the object of the communication.

While the ability to interrupt the speech of another seems quite natural, it is an aspect of face-to-face communication not found in many electronic telecommunications systems. Indeed, the ability to both speak and be heard at the same time presents technical complications in most telecommunication systems. For example, if we consider radio frequency carrier wave transmissions, if two parties to a conversation transmit at the same time, the signals will interfere with each other causing beat frequency oscillations, feedback and the like. Systems which solve this problem and thus allow the parties to the conversation to both speak and be heard at the same time are referred to as duplex systems. This can be achieved, for example, in the case of radio frequency communication, by a pair of transmitters operating with respective receivers at two different frequencies, one assigned to each of the parties.

In contrast, until the introduction of speaker telephones, virtually all telephones were duplex systems. Generally, the operative portion of telephone systems during this period comprised the series combination of a variable resistance carbon microphone and an electromagnetic earphone. As the caller spoke over the line, a diaphragm coupled to a carbon powder compartment in the microphone caused successive compressions to be exerted against the carbon powder in the compartment thus varying the electrical resistance of the compartment. This in turn varied the current passing through the series circuit resulting in a modulation of a signal placed across the series combination. This modulated signal, modulated at the actual frequency of the voice signal being transmitted, was then sent over the telephone system to the telephone set of the other participant to the telephone conversation.

This system, which continues in use substantially unchanged from the original instruments developed by Bell in the 1870's, as noted above, inherently has a duplex characteristic. Duplex communication is achieved because the audio frequencies involved do not cause unacceptable interference with each other and because the gain of the potential feedback loop between the carbon microphone and the earphone is far less than one.

At the advent of speaker telephones, it became necessary to introduce into the telephone instrument, an audio amplifier for receiving audio signals from the telephone central office and amplifying them to drive a loudspeaker. This immediately presented the problem of preventing feedback between a microphone adjusted for sensitivity to the voice of a person who is not speaking directly into it while making the system unresponsive to audio signals introduced into the environment by the loudspeaker. To somewhat better understand this problem, it must be kept in mind that the telephone is a two-wire system used to carry both the transmitted and received signal. If the transmitted signal is thus allowed to be amplified by the amplifier which amplifies the received signal which is also carried on the same two wires, ambient noise will be amplified and feedback oscillations are likely to ensue at normal levels of speaker amplitude.

One approach to this problem was embodied in speaker phone systems which included separate microphones and loudspeakers, both of which had some directional characteristic designed to ensure that information on loudspeaker would be loud enough for the telephone use to hear while at the same time having less audio field strength at some point where the microphone was placed. Likewise, the solution involved a microphone whose sensitivity characteristic was directed toward the mouth of the individual using the system with minimal sensitivity in the vicinity of the speaker.

Thus, design objectives involved reducing the gain of the feedback loop between the microphone and the speaker to less than one with the volume control for the system set at a level which would allow easy intelligibility of the signal.

Such an approach does not, in principle, provide a commercially acceptable level of performance, as, for example, it imposes limits on the location of the parties to the conversation. Moreover, the provision of several microphones is required in order to achieved good spatial separation between the microphone and the speaker and, as a result, the system becomes somewhat cumbersome physically. As a practical matter, it was also necessary for the user to adjust the position of the various parts of the system as well as the volume on it. For persons without technical ability, successful operation of such a system was a hit or miss proposition and, in practice, even a reasonable facsimile of the best possible performance of the system was seldom achieved, with most users settling for barely operational configurations despite various electronic systems for attempting to alleviate these problems.

Another approach to this problem and one which is probably most widespread in modern communication systems is the sacrifice of duplex operation to trouble-free speaker telephone operation. Generally, these systems incorporate an electronic switch which either turns off the speaker when the user is speaking or disables the microphone when the party at the other end of the telephone is speaking and compares signal intensities when signals are being produced at both ends of the telephone conversation.

In accordance with so-called "hybrid" technology, a duplex solution to the speaker telephone problem, without the above difficulty, has been approached. Generally, such systems operate by introducing a hybrid electronic circuit which, is meant to approximate the complex impedance of the telephone system, and to produce a cancellation signal.

This cancellation signal, when added to the signal on the telephone system (comprising both the transmitted and received signal) results in generating a third signal which includes only the received signal, which third signal is, in turn, sent to the amplifier and loudspeaker of the speaker telephone system.

While such an approach would appear to provide a perfect solution to the duplex speaker telephone problem, as a matter of fact, the approach suffers from several inadequacies. Firstly, telephone system line impedances vary greatly from system to system in different parts of the country and even from exchange to exchange within the same city. Thus, it becomes necessary for the system to be installed and the complex impedance adjusted to minimize feedthrough of the signal to be transmitted into the telephone speaker amplifier. Naturally, this represents a substantial expense insofar as it involves having a technician on site for installation of the system. The increase in cost is significant enough that, for the great majority of users, such systems are not, from an economic standpoint, a practical option.

Moreover, even after such a system is installed, experience has shown that the complex impedance of the telephone lines will vary from call to call and from time to time depending upon the lines being used by the central office switching system, environmental factors, and the like. Thus, the above on site adjusted systems, at best, represent only an approximation and, for that matter, an approximation of irregular quality depending upon the nature of the particular telephone system with which they are used.

SUMMARY OF THE INVENTION

The invention as claimed is intended to provide a remedy. It solves the problem of how to provide duplex communication over conventional telephone lines with good audio characteristics and substantially without the above discussed problems. The same is achieved through use of a multiple tone measurement and adjustment sequence o the initiation of a telephone call either initiated at or received by the inventive telephone system.

More particularly this is achieved by applying a plurality of tones of different frequency to the telephone line, measuring the complex received signal and then adjusting a synthesized RLC hybrid circuit to more closely respond the same way as the telephone line and then repeating that process, until an acceptable degree of conformity between the hybrid and the telephone line has been achieved.

A speaker telephone, comprising a microphone and a loudspeaker is disclosed. An amplifier has its output coupled to the loudspeaker. This amplifier has noninverting and inverting inputs. A switch having two positions couples the microphone to the amplifier or couples the tuning signal source to one of the inputs of the amplifier. A tuning signal source and control circuit output a tuning signal. Initiation means initiates a tuning sequence by causing the switch to be in the second position and causing the tuning signal source and control circuit to generate tuning signals. A coupling device is connected to one of the inputs of the amplifier and adapted to be connected to a telephone circuit. The coupling device inputs signals from a telephone circuit to the amplifier to be amplified by the amplifier and converted into audio signals by the loudspeaker and couples signals from the telephone circuit to the amplifier. A hybrid voltage generator circuit is responsive to the output of the microphone when the switch couples the microphone to the amplifier to generate at its output a cancellation signal. The cancellation signal is coupled to the other input of the amplifier. The cancellation signal has a magnitude and phase which results in substantially cancelling at least a portion of the signals produced by the microphone from appearing at the output of the amplifier.

A detector responds to the output of the amplifier. In response to the tuning signals, it generates an error signal. The circuit means receives the error signal and derives control signals in response thereto. The control signals are sent to the hybrid circuit to control parameters of the hybrid circuit to achieve cancellation of a substantial portion of the signal output by the microphone at the output of the amplifier.

BRIEF DESCRIPTION OF THE DRAWINGS

One way of carrying out the invention is described in detail below with reference to drawings in which:

FIGS. 15-19 illustrate the characteristics of the circuit illustrated in FIG. 14.

BEST MODE FOR CARRYING OUT THE INVENTION

Some idea of the complexity of the problem of generating an effective hybrid circuit can be appreciated when one considers the range of overall impedances which must be accommodated by the system. It has been reported that in one series of measurements from a single location involving calls to the same local exchange, calls to other local exchanges, calls to suburban exchanges and long distance calls to different area codes, those measurements in the range of ±1 standard deviation at 200 Hz yielded results varying from 450 to 1700 ohms. Thus, the 600 ohm impedance routinely referred to in the literature as the impedance of a telephone line is, from a practical standpoint, of minimal importance to many applications.

Moreover, while the purely resistive component of the impedance of a telephone line is for a given telephone call relatively well behaved, the reactive component includes both capacitive and inductive components. This results in the net impedance varying with frequency both in magnitude (resistance plus reactance) and in sign (inductive reactance or capacitive reactance).

The net inductive/capacitive component is commonly referred to as the imaginary portion of the impedance or the reactance while the resistive component of the impedance is referred to as the real component.

Figure 1:
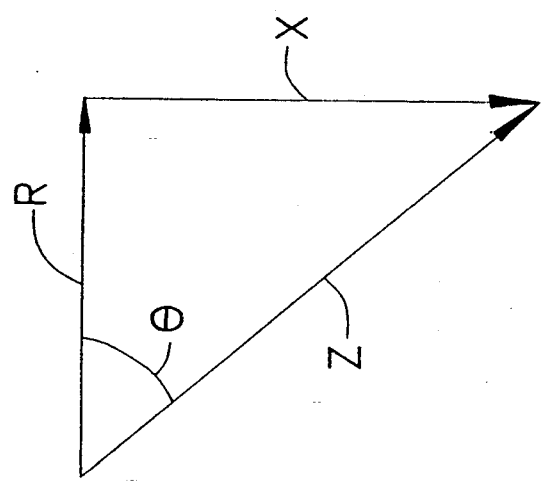
FIG. 1 is a graphic representation showing impedance comprising the vector sum of a reactance and a resistance.

Referring to FIG. 1, the real component R and an imaginary component X are vectorially illustrated. The resultant impedance Z may be obtained by vector addition as is graphically illustrated in FIG. 1. In the case of FIG. 1, the reactance is of a capacitive nature and, accordingly, is referred to as $X_c$. If the reactance were of opposite sign (i.e., positive), the reactance would be of an inductive nature and could be referred to as $X_L$. As an alternative to being expressed in terms of a real and an imaginary component of a given sign, the impedance may be viewed in terms of a magnitude Z and a phase angle $\theta$.

Figure 2:
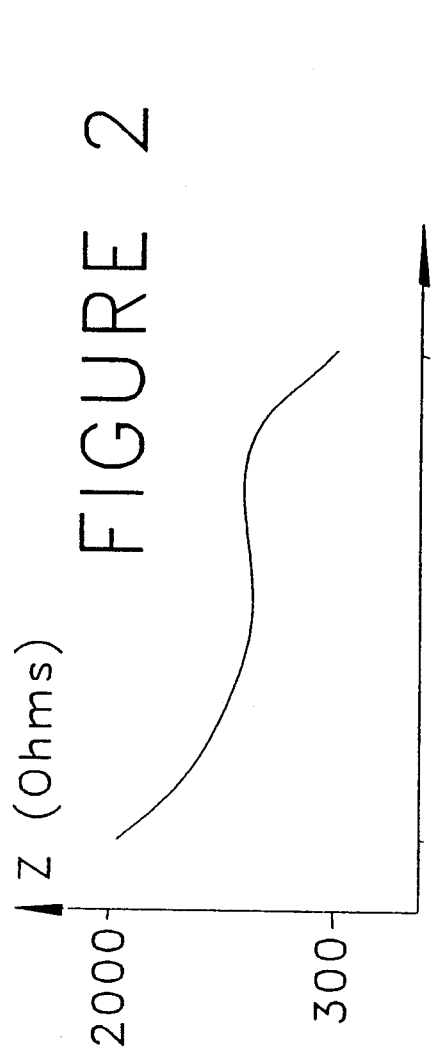
FIGS. 2 and 3 illustrate the characteristics of a telephone line.
Figure 3:
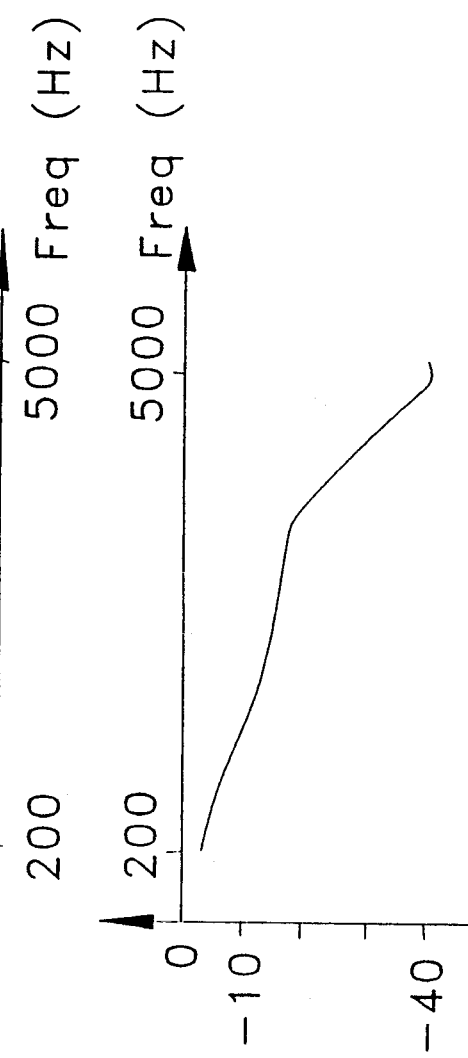

As noted above, the reactance of a telephone line varies as a function of frequency. A typical curve showing the variation in impedance Z as a function of frequency in a telephone line is illustrated in FIG. 2. Likewise, the angular component for the sam telephone line is illustrated in FIG. 3. As can be seen from these figures, the magnitude Z and angle $\theta$ of the impedance undergoes significant variation within a nominal working range of 200 to 5,000 hertz.

Figure 4:
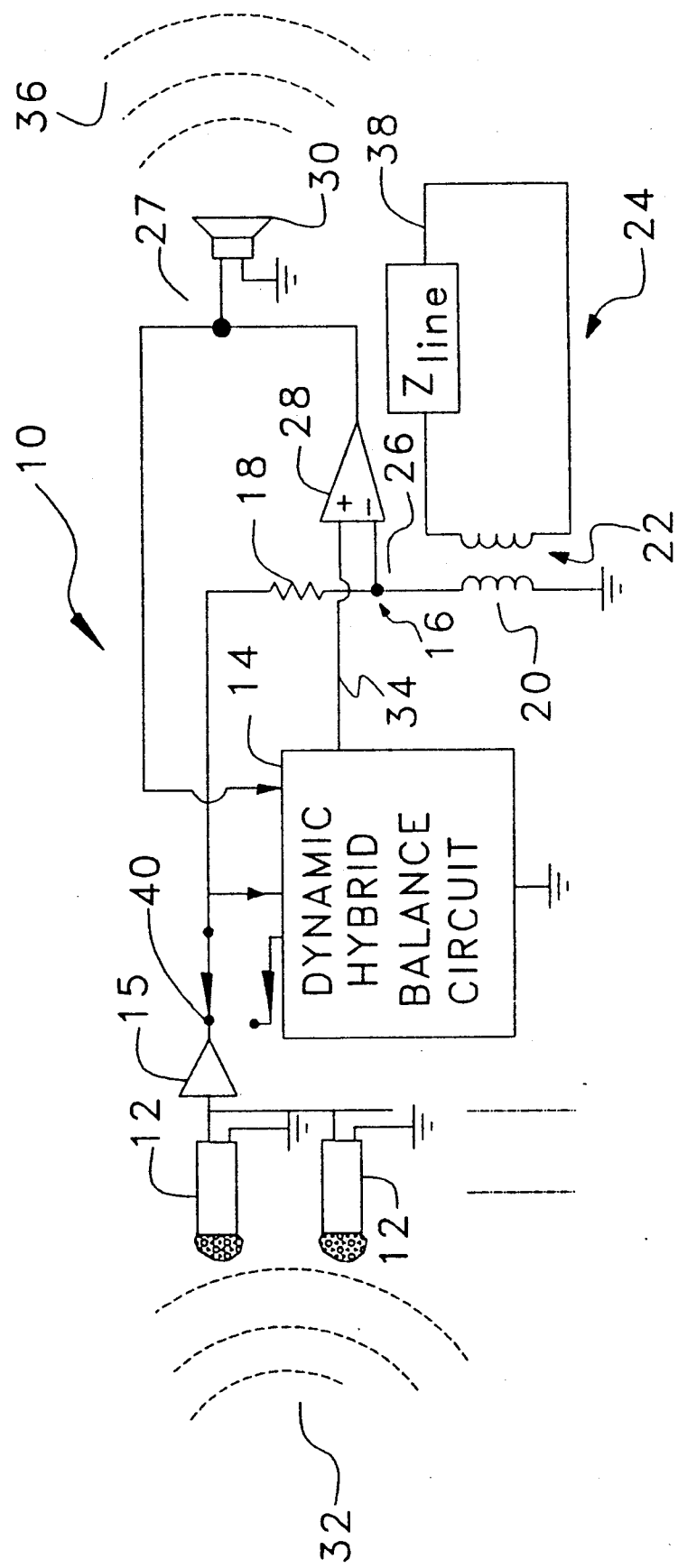
FIG. 4 is a simplified block diagram of a speaker telephone system constructed in accordance with the present invention.

Referring to FIG. 4, a speaker telephone 10, constructed in accordance with the present invention is illustrated. Generally, speaker telephone 10 comprises one or more microphones 12 for receiving an audio signal to be transmitted. The amplified output voltage of microphones 12 are coupled to a hybrid balance circuit 14 and to a voltage dividing network 16 comprising a voltage divider resistor 18 and the primary 20 of an isolation transformer 22 which couples telephone 10 to telephone lines 24. Transformer 22 is a 1:1 transformer of conventional design.

The output point 26 of network 16 is coupled to the inverting input of a differential amplifier 28. The voltage output of hybrid balance circuit 14 is coupled to the non-inverting input of differential amplifier 28. The output of differential amplifier 28 is, in turn, coupled to a loudspeaker 30. During operation, a sound 32 to be transmitted impinges upon microphones 12 resulting in the generation of an electrical signal proportional to the amplitude of sound waves 32. This electrical signal is sent via resistor 18 to the inverting input of differential amplifier 28.

In similar fashion, the output of microphones 12 is also sent to hybrid balance circuit 14 which outputs a signal on its output line 34 which is equal in magnitude and phase to the signal produced at point 26 by that portion of the signal from microphone 12 coupled via resistor 18. Accordingly, the signal sent to amplifier 28 by microphones 12 is subtracted from the signal produced over line 34 resulting in no output from speaker 30 in response to the output of microphones 12. Thus, sound waves 32 which appear at microphones 12 do not exit the system through the speaker 30 of speaker telephone 10, to the extent that the signal on line 34 is identical to the signal at point 26.

Conversely, the signal present at point 26 is transmitted via isolation transformer 22 to the telephone line 24 for transmission to the party with whom communication is occurring. Likewise, signals received along line 24 are brought by isolation transformer 22 to point 26, where they are amplified and appear at loudspeaker 30 as an amplified received sound wave signal 36.

Dynamic hybrid balance circuit 14 is an intelligent complex (i.e. frequency dependent) voltage divider designed to mimic the voltage produced by the complex voltage divider comprising resistor 18 and the complex impedance 38 of telephone line 24. This is achieved during an initial set-up, when a switch 40 couples a test signal to amplifier 28 from dynamic hybrid balance circuit 14.

Figure 5:
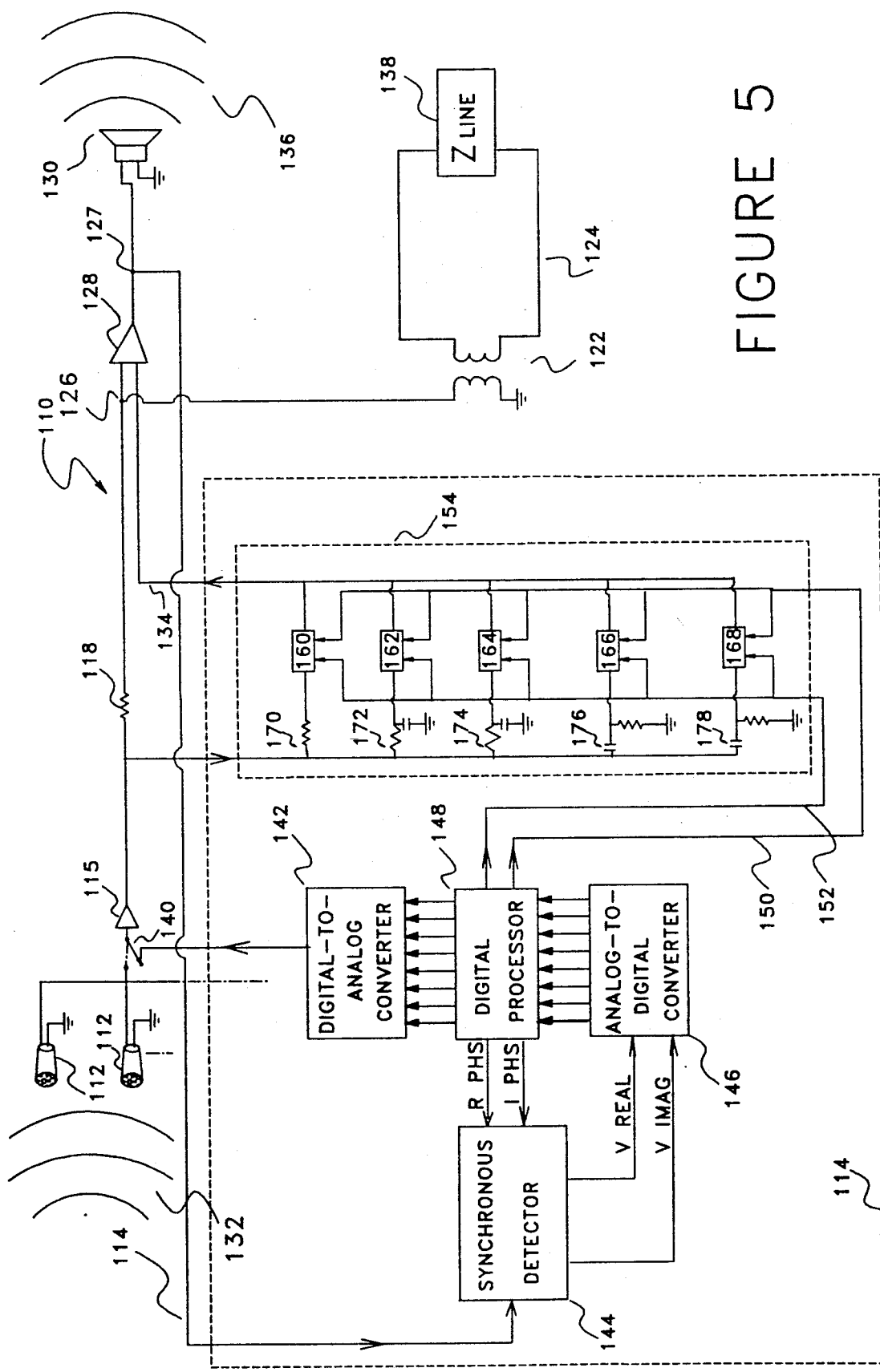
FIG. 5 is a more detailed diagram of a telephone system constructed in accordance with the present invention.

FIG. 5 is a more detailed embodiment which illustrates this aspect of the invention which allows automatic compensation for variations in line impedance due to connection to different exchanges or the employment of different equipment in the same exchange.

A detailed block diagram of a system constructed in accordance with the invention is illustrated in FIG. 5. Generally, similar parts or parts performing analogous corresponding or identical functions to those of the FIG. 4 embodiment are numbered herein with numbers which differ from those of the earlier embodiment by multiples of one hundred.

Referring to FIG. 5, speaker telephone system 110 includes a switch 140 which couples tones from digital-to-analog converter 142 to amplifier 115, in order to measure the telephone line impedance 138 and couples the output of microphone 112 to amplifier 115 during normal voice operation of the speaker telephone.

Digital-to-analog converter 142 and synchronous detector 144 are controlled by a digital processor 148. The analog output of synchronous detector 144 sends the real and imaginary components of the voltage at point 127 to an analog-to-digital converter 146. Analog-to-digital converter 146 converts these voltages to digital representations of their values and sends this digital information to digital processor 148.

The output of digital processor 148 is sent to a pair of lines 150 and 152 which carry up/down control signals and increment control signals, respectively. These two control signals adjust the parameters of the hybrid voltage generator circuit 154. Hybrid circuit 154 includes a plurality of adjustable resistances 160-168 which, in response to an increment command will adjust themselves either upward or downward depending upon the state of their up/down input. This has the result of adjusting that characteristic of the circuit which is introduced into hybrid circuit 154 by networks 170-178, which are associated with adjustable resistances 160-168, respectively. Network 170 comprises a simple resistive component. Networks 172 and 174 are low pass RC networks which function to introduce capacitive components. Networks 176 and 178 are high pass RC circuits which introduce capacitive components into the characteristic of hybrid circuit 154.

Figure 6:
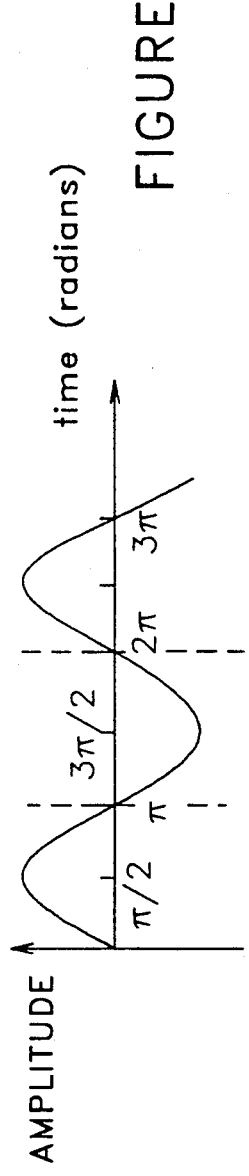
FIG. 6 is a diagram of a tuning signal used in accordance with the system of the present invention.

In accordance with the preferred embodiment, when a call is received or initiated by the system by either answering of the telephone or connection to an outside line, switch 140 is actuated into the position shown in solid lines in FIG. 5, after which an initial set-up sequence is followed. Digital processor 148 then generates digital signals which cause digital-to-analog converter 142 to produce at its output sine waves at approximately 300 Hertz, 480 Hertz, 780 Hertz, 1260 Hertz, 2040 Hertz and 3300 Hertz, as illustrated in FIG. 6. These frequencies are impressed onto the input of amplifier 115 which in turn sends them to hybrid circuit 154 and, via resistor 118 to point 126.

The objective of hybrid circuit 154 is ideally to generate a voltage on line 134 at the non-inverting input of amplifier 128, in order that the voltage created at point 126 (in response to the output of converter 142 during initial setups) will be subtracted equally in magnitude and in phase in order that substantial cancellation will occur in amplifier 128. To the extent that this is achieved, the signal input into amplifier 115 will not appear at the audio output 136 of speaker 130. In order for this to occur, hybrid circuit 154 should have the same reactive and resistive components as the complex impedance 138 of the telephone line. In accordance with the invention, this is achieved by the adjustment of resistances 160–168 by digital processor 148 in successive interactions comprising application of sine waves by converter 142 of the above series of sine waves, detection of the voltage at point 12 by detector 144 to produce an error signal, the furnishing of this error signal by detector 144 to digital processor 148 and the adjustment of resistances 160–168 by processor 148, and the repetition of this cycle. Such repetition may be done a fixed number of times (i.e., ten times) or until a desired degree of matching is achieved between telephone line impedance 138 and the impedance of hybrid circuit 154.

This is achieved by applying the output of amplifier 128 to synchronous detector 144 and measuring the results and through successive applications of the above series of sine waves and successive adjustment of adjustable resistances 160–168 to match the impedance 138 of telephone line 124 as reflected by 1:1 transformer 122 to point 126.

In order to achieve this end, during the set-up period the sine wave tones from digital-to-analog converter 142 are coupled through electronic switch 140 to amplifier 115, and from there to hybrid circuit 154 and to point 126 via resistor 118. The response to these tones created by the complex (i.e., frequency dependent) voltage divider comprising line impedance 138 and resistor 118 are subtracted from the synthesized approximation of these voltages produced by hybrid circuit 134 and applied via line 134 to the non-inverting input of amplifier 128.

If substantially zero voltage is present at the output of amplifier 128 for all frequencies, then a reasonable approximation of the situation where the characteristics of the line have been matched within an acceptable limit is present. The initial set-up testing sequence is then terminated, and switch 140 switched to the position shown in dashed lines in FIG. 5, allowing the telephone conversation to begin. If desired, this can be signalled to the telephone user by a light or tone.

Digital processor 148 determines whether the output of amplifier 128 is above or below an acceptable threshold level in the following way. The output of amplifier 128 is applied to the input of synchronous detector 144. Synchronous detector 144 receives two digital control signals $R_{phs}$ and $I_{phs}$ from digital processor 148 which enable the detector to resolve the uncancelled sine wave at its input into two analog voltages $V_{real}$ and $V_{imag}$. These two voltages represent the extent to which hybrid circuit 154 is not replicating the circuit comprising resistor 118 and telephone line impedance 138.

Depending upon the magnitude of the real and imaginary components provided by synchronous detector 144, digital processor 148 adjusts adjustable resistances 160–168 in order that a desired portion of the characteristic created by networks 170–178 will change the output of the hybrid circuit 154 by a desired magnitude that will result in an appropriate cancellation signal at the non-inverting input to amplifier 128.

After this initial adjustment, the sequence of the six tones referred to above may be repeated by digital processor 148 and digital-to-analog converter 142 and, if the digital processor which functions as a threshold detector finds all signal frequencies present at point 127 to be acceptably low for all of the tones, digital processor 148 terminates the set-up sequence and restores switch 140 to the position shown in phantom lines in FIG. 5. Again, if the threshold detector finds the level of signal magnitude at point 127 unacceptably high, the adjustment procedure is repeated again.

Figure 7:
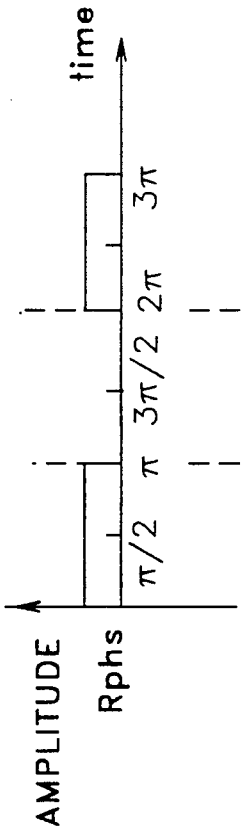
FIGS. 7-13 illustrate operation of a part of a system constructed in accordance with the present invention.
Figure 8:
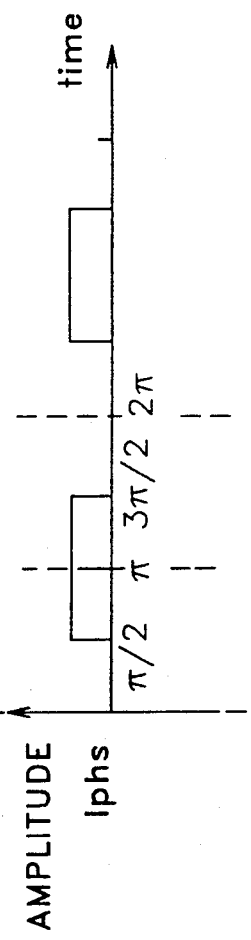

Considering the operation of the inventive system in greater detail, simultaneous with the generation of each of the sine wave signals by digital-to-analog converter 142, respectively, digital processor 148 generates the parameters $R_{phs}$ and $I_{phs}$. $R_{phs}$ is illustrated in FIG. 7 and $I_{phs}$ is illustrated in FIG. 8. These are simple digital signals which go on and off in phase and 90° out of phase with the sine wave outputs of digital-to-analog converter 142.

Figure 9:
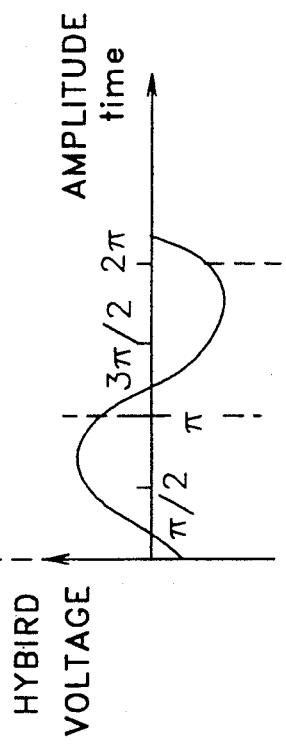
Figure 10:
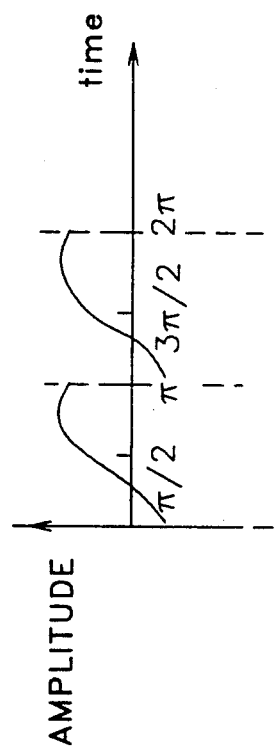
Figure 11:
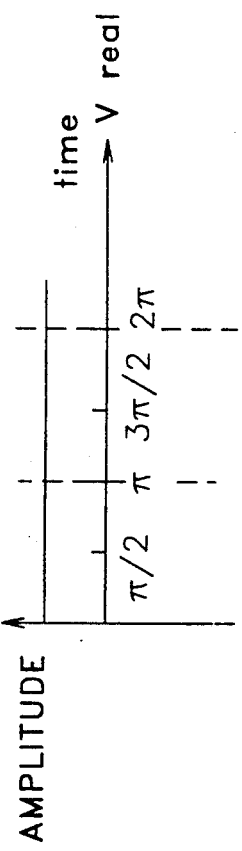

Synchronous detector 144 then derives two signals. In the first case, the voltage at point 127 is coupled to synchronous detector 144 and the product of the voltage at point 127 and $R_{phs}$ is generated. A possible signal at point 127 is illustrated in FIG. 9. The product of that signal and the signal illustrated in FIG. 7 ($R_{phs}$) is illustrated in FIG. 10. The signal is then integrated over time to obtain the real component of the voltage at point 127 as illustrated in FIG. 11.

Figure 12:
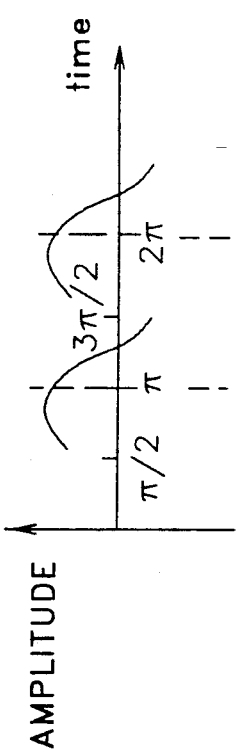
Figure 13:
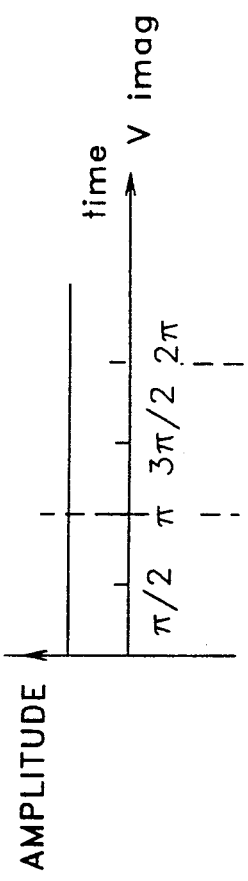

In the second case, in a manner similar to that described above, synchronous detector 144 generates the product of the voltage at point 127 and the signal illustrated in FIG. 8 ($I_{phs}$) to generate the waveform illustrated in FIG. 12. This waveform is then integrated over time and the resultant signal, illustrated in FIG. 13, has a value substantially equal to the magnitude of the imaginary component of signal present at point 127. We can refer to the signal present at point 127 as the hybrid voltage.

Depending upon the amplitude of the real and imaginary components of the hybrid voltage, appropriate adjustments are sent along lines 150 and 152 by digital processor 148.

Figure 14:
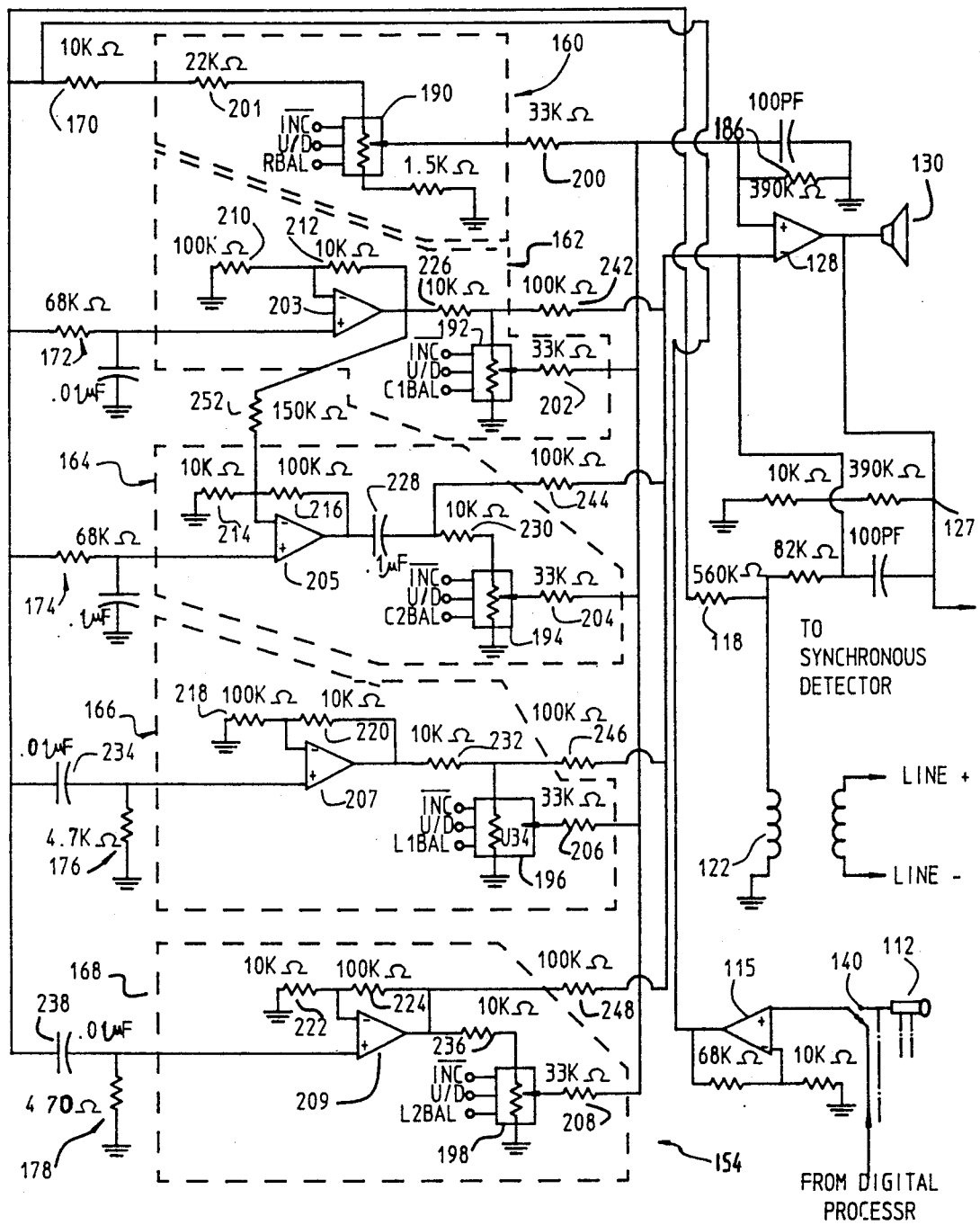
FIG. 14 is a detailed diagram of a portion of the circuit diagrammed in FIG. 5.

In accordance with the preferred embodiment of the invention, the hybrid voltage generating circuit 154 takes the form illustrated in detail in FIG. 14. More particularly, amplifier 115 is provided with a pair of resistances giving it a net gain of 7.8, as illustrated. Generally, it is noted that the values of principal component parts illustrated in FIG. 14 are given directly on the diagram for purposes of ease of understanding.

Adjustable resistances 160–168 each comprise digitally controlled electronic potentiometers 190–198, respectively, which are commercially available under Catalog No. X90103P from the Xicor Company of Milpitas, Calif. The wiper terminals of potentiometers 190–198 are coupled via resistors 100–108, which have a value of 33 kilohms, to the non-inverting input of amplifier 128. Resistor 186, which has a value of 390 kilohms, serves the function, in conjunction with resistors 200–208, of providing an input impedance at the non-inverting input of amplifier 128 that is equal to the input impedance of all resistors at the inverting input of amplifier 128. This equality assures cancellation of identical input currents to balanced differential amplifier 128.

The outputs of networks 170–178 are, respectively, coupled to potentiometers 190–198 via resistor 201 and amplifiers 203–209, respectively. Amplifiers 203–209 have gains of 1.1, 11, 1.1, and 11, respectively, as a consequence of the values of the resistors 210–224.

The output of amplifier 203 is coupled via 10 kilohm resistor 226 which performs the function of scaling the voltage to potentiometer 192.

Capacitor 228 is used to couple the output of amplifier 204 to potentiometer 194 through resistor 230. Capacitor 228 has a value of 0.1 μF, which means that it substantially passes all frequencies above 100 Hz, but isolates potentiometer 194 from any d.c. voltage. This is important because the gain of amplifier 204 can multiply the effects of any small d.c. voltage at the output of amplifier 115.

Resistor 232 couples the output of amplifier 207 to potentiometer 196. There is no concern with respect to d.c. levels here because capacitor 234 in network 176 removes any d.c. coupling. Similarly, capacitor 238 prevents any d.c. levels from passing to amplifier 209 and appearing at the output of the amplifier.

It is noted that d.c. voltage present at the output of amplifier 203 is not a consideration because of the small gain of this amplifier (i.e., about 1.1).

The outputs of amplifiers 203-209 are coupled via 100 kilohm resistors 242-248 to the inverting input of amplifier 128 for the purpose of providing both a positive and a negative adjustment capability for electronic potentiometers 190-198.

In accordance with the preferred embodiment, the output of amplifier 203 is coupled via another resistor 252 having a resistance of 150 kilohms to the negative input of amplifier 205 for the purpose of making the real and the imaginary compensations provided by networks 172 and 174 more independent.

Generally, in accordance with the present invention, potentiometers 192 and 196 are set at a position where the resistance between their wiper terminals connected respectively to resistors 202 and 20 and ground is approximately one-third the total resistance of the potentiometer along the path extending between ground and resistors 242 and 246. The total resistance of each potentiometer 190-198 is approximately 10 kilohms. The position of the wiper terminals of potentiometers 192 and 196 are adjusted in response to the real and imaginary components generated at the output of synchronous detector 144. Adjustment is made by digital processor 148 which outputs an up or down signal to the U/D inputs of potentiometers 190-198 and a number of increments to the INC inputs of the potentiometers in order to bring them to the desired value.

For example, if the real component is found to be relatively large at 780 and 1260 Hz and positive, potentiometer 190 will be decremented a scaled number of pulses by digital processor 148.

On the other hand, if the real component is found to be relatively large only at 200 Hz and 480 Hz and negative, potentiometer 192 will be incremented up a scaled number of pulses by digital processor 148.

If the imaginary component is found to be relatively large at 300 Hz and 480 Hz and positive, potentiometer 196 will be decremented a scaled number of pulses by digital processor 148.

Further, if the imaginary component is found to be relatively large at 2040 and 3300 Hz and negative, potentiometer 198 will be decremented a scaled number of pulses by digital processor 148.

Finally, if the imaginary component is found to be relatively large at 2040 Hz and 3300 Hz and negative, potentiometer 198 will be decremented a scaled number of pulses by digital processor 148.

Figure 15:
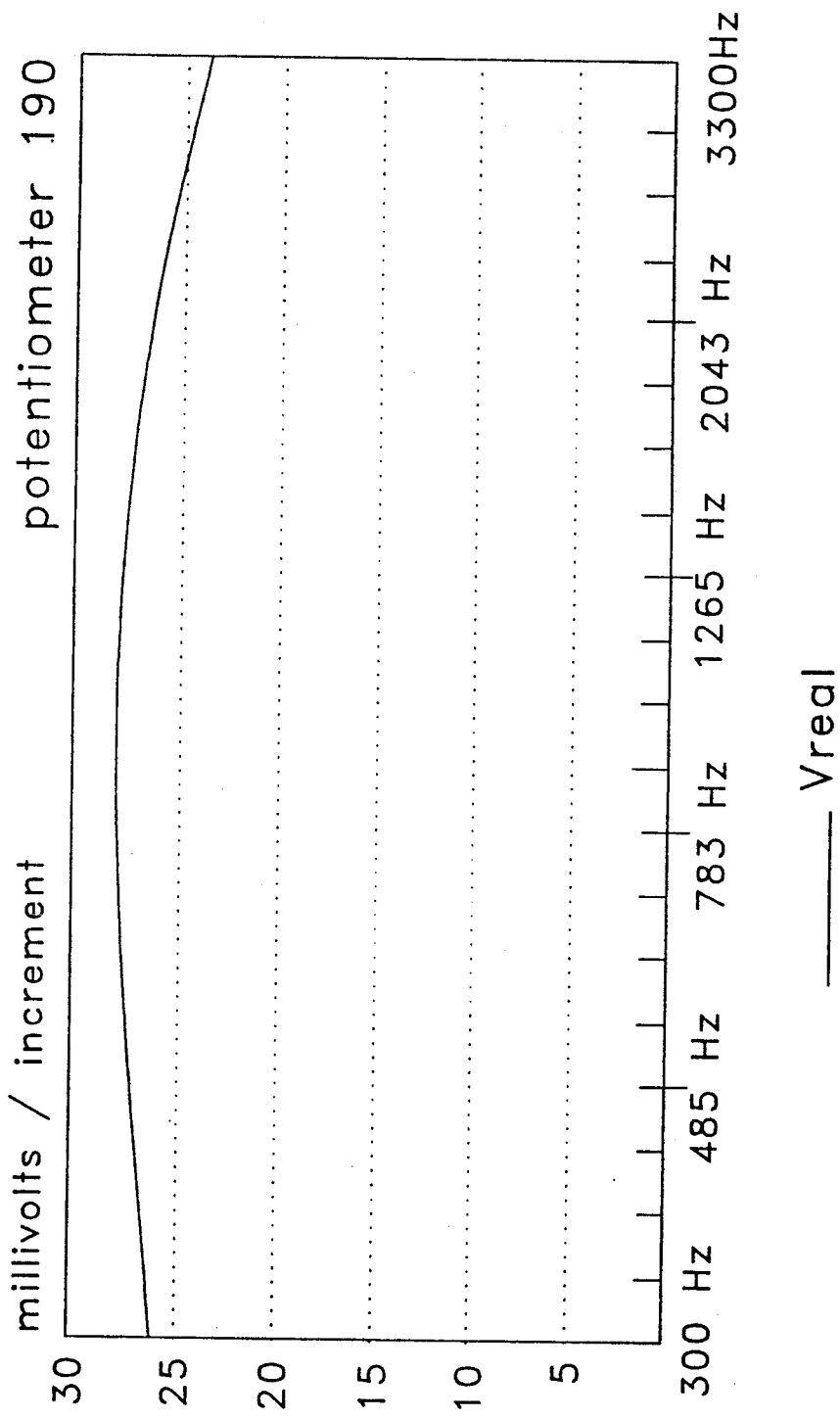

The operation of the circuit illustrated in FIG. 14 may alternatively be understood with reference to FIGS. 15-19. In particular, as illustrated in FIG. 15, adjustment of potentiometer 190 has the primary effect of varying the resistive component. This will affect the voltage at point 127 as illustrated graphically in FIG. 15. The degree to which real components are scaled by adjustment of potentiometer 190 is illustrated in FIG. 15 in terms of millivolts per increment at analog-to-digital converter 146.

In accordance with the preferred embodiment, the resistance and capacitive reactance of that portion of the hybrid circuit comprising network 172 and electronically adjustable resistance 162 are of comparable magnitude at the lowest frequency of about 300 Hertz. See FIG. 16. Reactive capacitance decreases by an order of magnitude at 3300 Hertz, as does the other component. Accordingly, this circuit tends to compensate for line impedances of the type which are typically caused by fixed inductances at specific points in the lines. Sometimes these are referred to as lumped impedances.

Generally, combinations of the various scaled amounts of the five characteristic curves (FIGS. 15-19) enable approximate modeling of the various frequency dependent impedances (i.e., lumped and distributed resistance, inductance and capacitance of most telephone lines. FIGS. 15-19 correspond to the effects in millivolts per increment of the adjustment of potentiometers 190-198 on the real and imaginary characteristics of the system.

Figure 16:
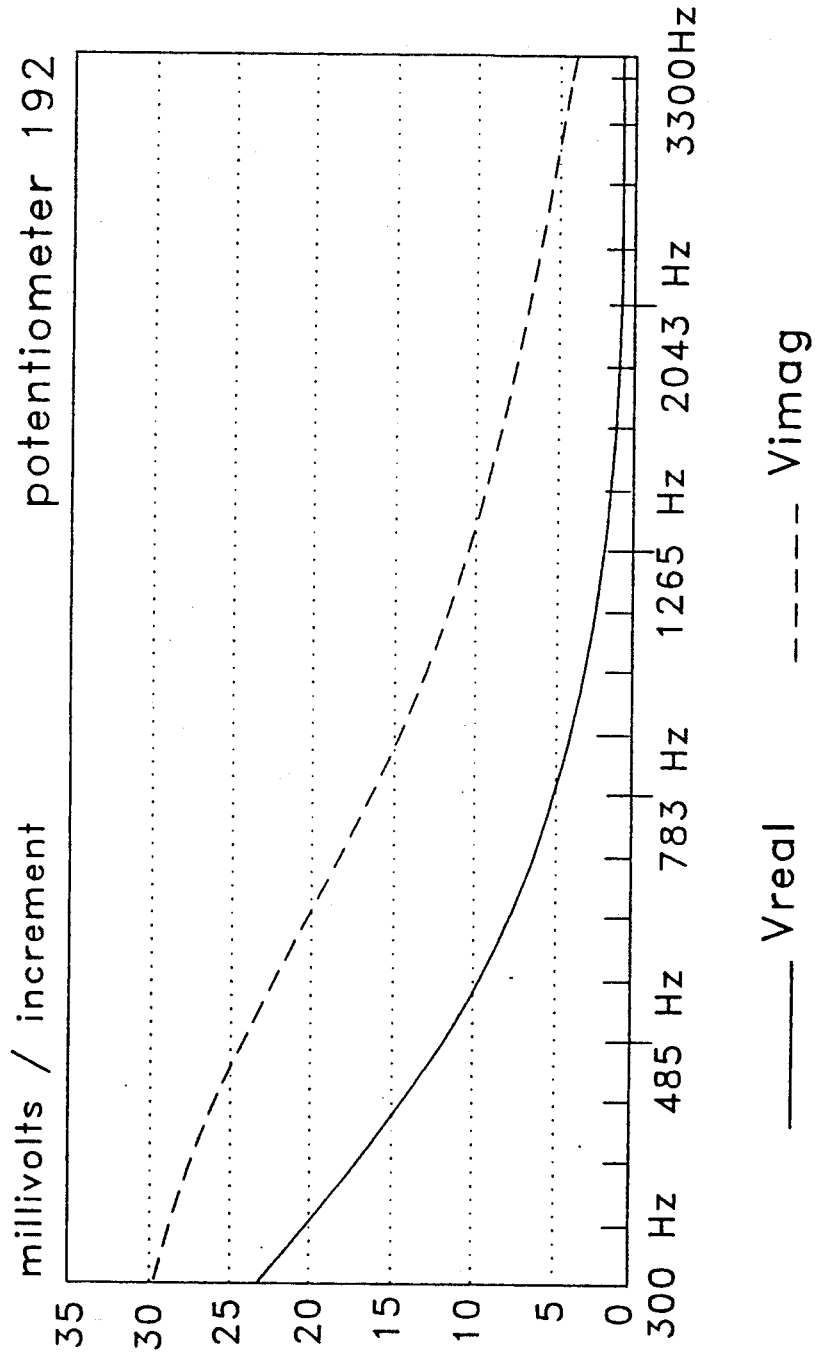
Figure 17:
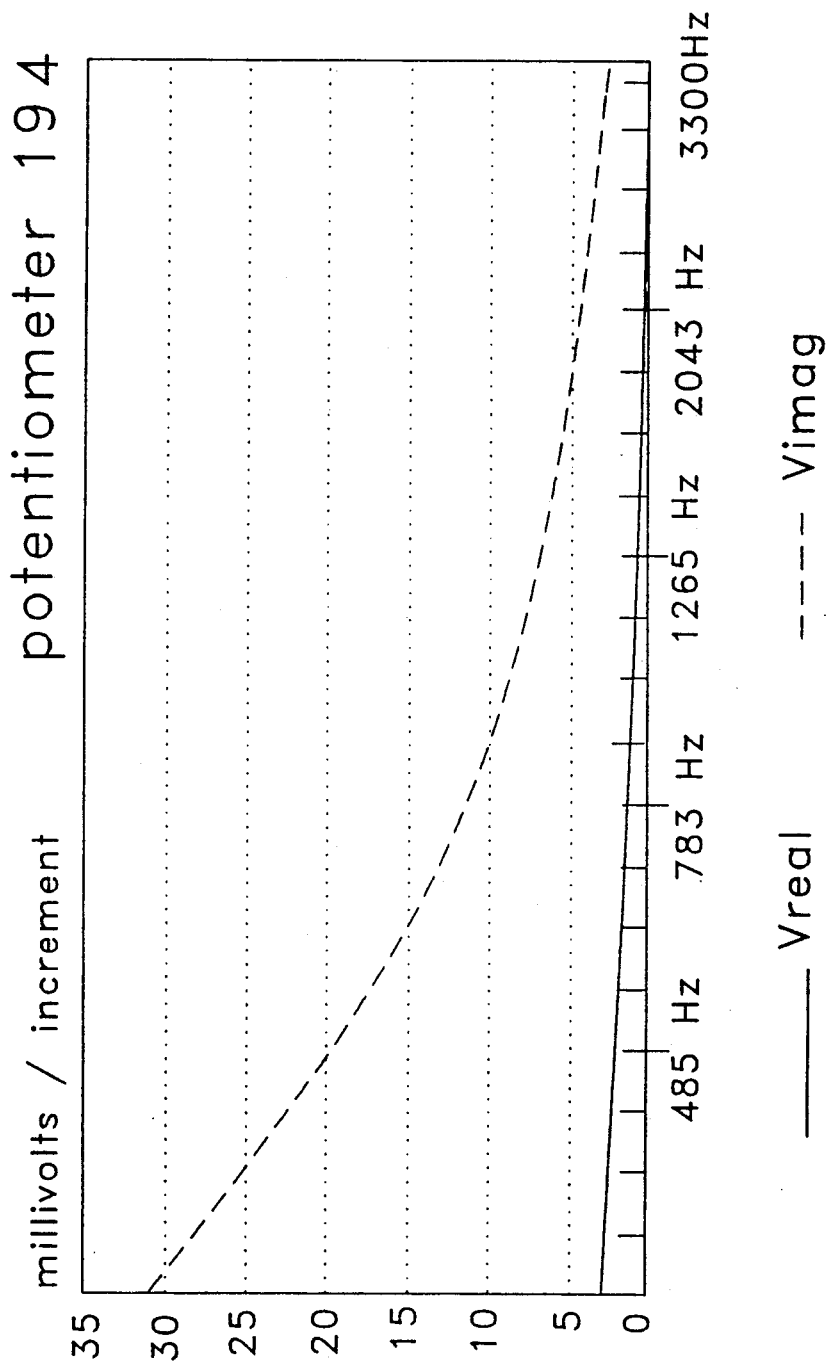
Figure 18:
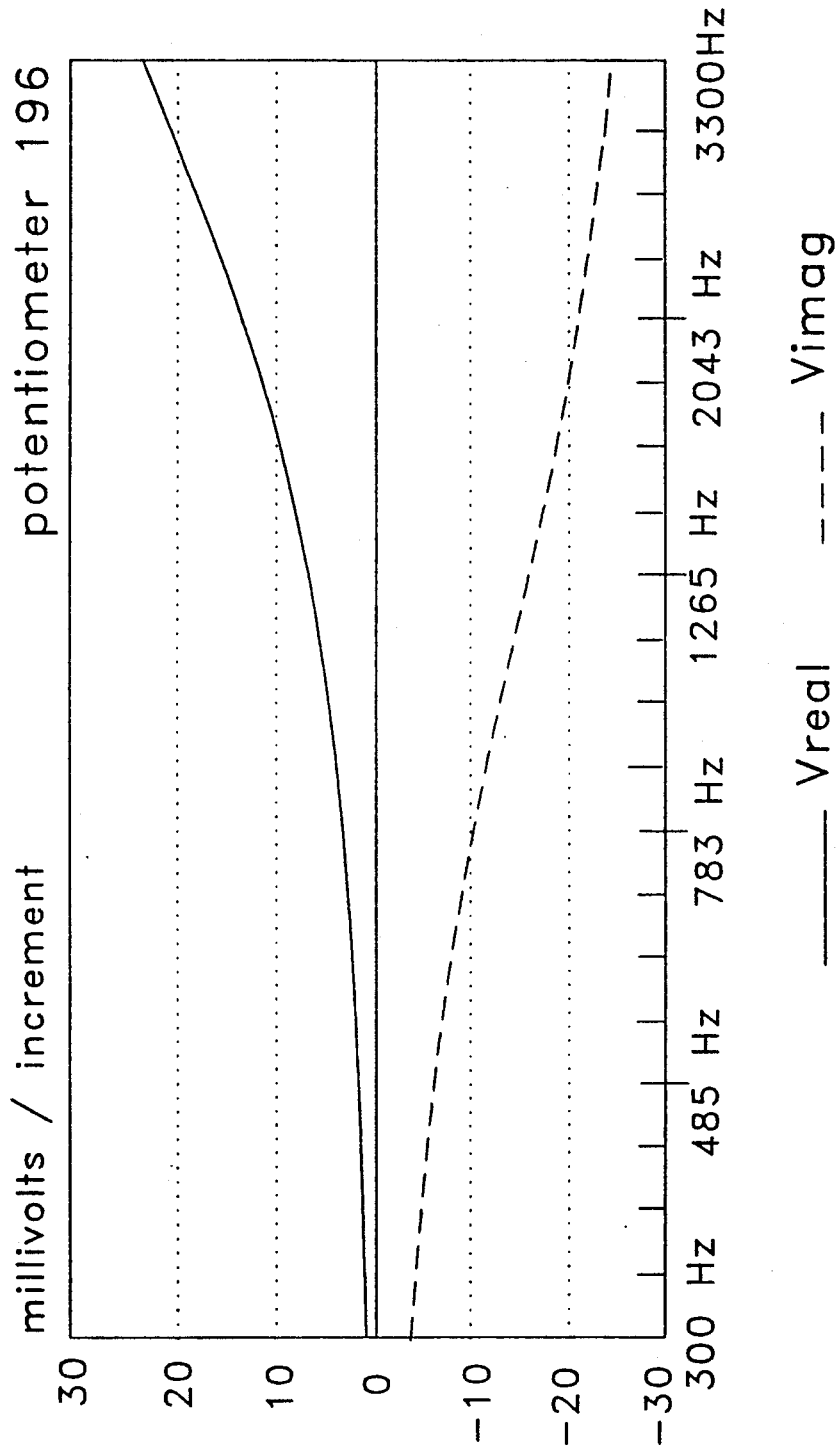

To summarize, FIG. 15 shows the variation of the hybrid resistive component by adjustment of potentiometer 190. FIG. 16 shows the variation of the hybrid low frequency real and imaginary components by adjustment of potentiometer 192. FIG. 17 shows the variation of the hybrid low frequency imaginary component by adjustment of potentiometer 194. FIG. 18 shows the variation of the hybrid high frequency real and imaginary components by adjustment of potentiometer 196. FIG. 19 shows the variation of the hybrid high frequency imaginary component by adjustment of potentiometer 198.

At the lowest frequency, the portion of hybrid circuit 154 composed primarily of network 174 and adjustable resistance 164 has a reactive capacitance less than its real component at 300 Hertz. Typically, the real component would be an order of magnitude greater than the imaginary component. At 3300 Hertz, both terms become negligible. See FIG. 17. It is noted that the gain of this portion of the device is an order of magnitude greater than that of the other capacitance circuit described above.

The circuits controlled by potentiometers 196 and 198 compensate for distributed inductive effects and lumped inductive effects, respectively.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:
1. A speaker telephone, comprising:
(a) a microphone outputting an electrical signal;
(b) a loudspeaker;
(c) a tuning signal source and control circuit which outputs a tuning signal;
(d) an amplifier whose output is coupled to said loudspeaker, said amplifier having two inputs, one of said inputs being a non-inverting input and the other of said inputs being an inverting input;

(e) a switch having two positions, said switch coupling said microphone to one of the inputs of said amplifier in a first of said two positions and coupling said tuning signal source to said one of the inputs of said amplifier in a second of said two positions;

(f) initiation means for initiating a tuning sequence by causing said switch to be in said second position and causing said tuning signal source and control circuit to generate tuning signals;

(g) a coupling device connected to said one of the inputs of said amplifier and adapted to be connected to a telephone circuit for inputting signals from a telephone circuit to said amplifier to be amplified by said amplifier and converted into audio signals by said loudspeaker;

(h) a hybrid voltage generator circuit responsive to the output of said microphone when said switch couples said microphone to said amplifier to generate at its output a cancellation signal, said cancellation signal being coupled to the other input of said amplifier, said cancellation signal having a magnitude and phase which results in substantially cancelling at least a portion of the signals produced by said microphone from appearing at the output of said amplifier; and (i) a detector responsive to the output of said amplifier in response to said tuning signals to generate an error signal, said control circuit receiving said error signal and deriving control signals in response thereto, said control signals being sent to said hybrid circuit to control parameters of said hybrid circuit to achieve cancellation of a substantial portion of the signal output by said microphone at the output of said amplifier.

2. A speaker telephone as in claim 1, wherein said control circuit is a microprocessor.

3. A speaker telephone as in claim 2, wherein said control circuit provides synchronization signals to said detector, and said detector is a synchronous detector.

4. A speaker telephone as in claim 3, wherein said synchronous detector detects the real and imaginary components of said error signal.

5. A speaker telephone as in claim 3, wherein said synchronous detector detects the real and imaginary components of said error signal.

6. A speaker telephone as in claim 5, wherein said hybrid voltage generator circuit synthesizes the effect of resistive, capacitive and inductive components of said telephone circuit.

7. A speaker telephone as in claim 6, wherein said hybrid voltage generator circuit synthesizes the effect of lumped, resistive, distributed, capacitive and inductive components of said telephone circuit.

8. A speaker telephone as in claim 7, wherein said hybrid voltage generator circuit comprises an adjustable resistive subsystem and a plurality of RC networks, said RC networks being adjustably coupled to said outputs of said hybrid circuit.

9. A speaker telephone as in claim 8, wherein said plurality of RC networks comprise four RC networks, two of which four RC networks are low pass networks and two of which four RC networks are high pass networks.

10. A speaker telephone as in claim 9, wherein said control circuit is a microprocessor.

11. A speaker telephone as in claim 10, wherein said control circuit provides synchronization signals to said detector, and said detector is a synchronous detector.

12. A speaker telephone as in claim 11, wherein said control circuit provides synchronization signals to said detector, and said detector is a synchronous detector.

13. A speaker telephone as in claim 12, wherein said microprocessor circuit generates synchronization signals which are in phase and 90° out of phase with said tuning signals.

14. A speaker telephone as in claim 13, wherein said tuning signals occur at frequencies of about 300, 500, 800, 1300, 2000 and 3000 Hertz.

15. A speaker telephone as in claim 13, wherein said microprocessor circuit terminates said tuning sequence if said error signal is below a predetermined threshold.

16. A speaker telephone as in claim 14, wherein said circuit terminates said tuning sequence if said error signal is below a predetermined threshold.

17. A speaker telephone as in claim 1, wherein said microphone is coupled to said amplifier through a resistance connected to one end to said amplifier, said coupling device is a transformer comprising two windings, one of said windings being connected to said amplifier and said one end of said resistor and the other of said windings being connected to said telephone circuit.

18. A speaker telephone as in claim 1, wherein said hybrid voltage generator circuit comprises five segments, the first segment generating a resistive component, the second and third segments generating high frequency components, and the fourth and fifth segments generating low frequency components.

19. A speaker telephone as in claim 18, wherein said second and fourth segments generate real and imaginary components, and said third and fifth components generate real or imaginary components.

20. A speaker telephone as in claim 19, wherein said third and fifth segments generate imaginary components.

* * * * *